United States Patent
Kim

(10) Patent No.: US 9,650,044 B2
(45) Date of Patent: May 16, 2017

(54) CONTROL SYSTEM AND METHOD FOR HOST VEHICLE

(71) Applicant: MANDO CORPORATION, Pyeongtaek-si (KR)

(72) Inventor: Rak-Young Kim, Yongin-si (KR)

(73) Assignee: MANDO CORPORATION, Gyeonggi-Do (KR)

(*) Notice: Subject to any disclaimer, the term of this patent is extended or adjusted under 35 U.S.C. 154(b) by 38 days.

(21) Appl. No.: 14/791,348

(22) Filed: Jul. 3, 2015

(65) Prior Publication Data

US 2016/0001776 A1    Jan. 7, 2016

(30) Foreign Application Priority Data

Jul. 4, 2014    (KR) ................. 10-2014-0083537

(51) Int. Cl.
| | |
|---|---|
| B60W 30/165 | (2012.01) |
| B60W 30/16 | (2012.01) |
| B60W 50/08 | (2012.01) |
| B60W 10/06 | (2006.01) |
| B60W 10/20 | (2006.01) |
| B60W 30/12 | (2006.01) |
| B60W 30/18 | (2012.01) |
| B60W 50/14 | (2012.01) |

(52) U.S. Cl.
CPC .......... *B60W 30/165* (2013.01); *B60W 10/06* (2013.01); *B60W 10/20* (2013.01); *B60W 30/12* (2013.01); *B60W 30/16* (2013.01); *B60W 30/162* (2013.01); *B60W 30/18163* (2013.01); *B60W 50/08* (2013.01); *B60K 2350/1028* (2013.01); *B60W 2050/146* (2013.01); *B60W 2540/04* (2013.01); *B60W 2540/20* (2013.01); *B60W 2550/308* (2013.01); *B60W 2710/30* (2013.01)

(58) Field of Classification Search
CPC .... B60W 30/165; B60W 10/06; B60W 10/20; B60W 30/12; B60W 30/16; B60W 30/162; B60W 30/18163; B60W 50/08
See application file for complete search history.

(56) References Cited

U.S. PATENT DOCUMENTS

| | | | |
|---|---|---|---|
| 9,428,188 B2* | 8/2016 | Schwindt | B60W 30/12 |
| 2005/0251323 A1* | 11/2005 | Heinrichs-Bartscher | B60K 31/0008 |
| | | | 701/117 |
| 2008/0042489 A1* | 2/2008 | Lewis | B60K 6/48 |
| | | | 303/152 |

(Continued)

FOREIGN PATENT DOCUMENTS

JP    10-086698    7/1998

*Primary Examiner* — Calvin Cheung
(74) *Attorney, Agent, or Firm* — Ladas & Parry, LLP

(57) ABSTRACT

Provided are a control method and system for a host vehicle. The control method in which the host vehicle has adaptive cruise control (ACC) includes selecting a lane or another vehicle as a target lane or a target vehicle for the ACC according to selection of a driver; when the lane is selected, controlling the ACC to cause the host vehicle to travel in the selected target lane; and when the other vehicle is selected, controlling the ACC to cause the host vehicle to follow the selected target vehicle, wherein the controlling includes changing the lane when the target lane or a lane of the target vehicle does not correspond to a lane of the host vehicle.

20 Claims, 8 Drawing Sheets

(56) References Cited

U.S. PATENT DOCUMENTS

| | | | |
|---|---|---|---|
| 2008/0059007 A1* | 3/2008 | Whittaker | G05D 1/0274 701/2 |
| 2009/0157461 A1* | 6/2009 | Wright | G06Q 10/06313 705/7.23 |
| 2009/0299552 A1* | 12/2009 | Villaume | G08G 1/22 701/3 |
| 2010/0198478 A1* | 8/2010 | Shin | B60W 10/06 701/96 |
| 2011/0118967 A1* | 5/2011 | Tsuda | B60W 30/10 701/117 |
| 2011/0241862 A1* | 10/2011 | Debouk | B60W 50/035 340/439 |
| 2013/0080040 A1* | 3/2013 | Kumabe | G05D 1/0293 701/117 |
| 2013/0345944 A1* | 12/2013 | Kasiraj | B60W 30/16 701/96 |
| 2014/0100734 A1* | 4/2014 | Yamashiro | G08G 1/22 701/23 |
| 2014/0145931 A1* | 5/2014 | Kim | B60K 35/00 345/156 |
| 2014/0218522 A1* | 8/2014 | Lavoie | G08G 1/0962 348/148 |
| 2015/0134225 A1* | 5/2015 | Kinugawa | B60W 30/143 701/96 |
| 2015/0149017 A1* | 5/2015 | Attard | B60W 30/182 701/23 |
| 2016/0103450 A1* | 4/2016 | Hogenmueller | G05D 1/0077 701/23 |
| 2016/0180707 A1* | 6/2016 | MacNeille | G08G 1/0962 701/117 |

* cited by examiner

CONTROL SYSTEM AND METHOD FOR HOST VEHICLE

CROSS-REFERENCE TO RELATED APPLICATION

This application claims the benefit of Korean Patent Application No. 10-2014-0083537, filed on Jul. 4, 2014 in the Korean Intellectual Property Office, the disclosure of which is incorporated in its entirety herein by reference.

BACKGROUND

1. Field

Embodiments of the present invention relate to a control method for a host vehicle, and more specifically, to a control method for a host vehicle having adaptive cruise control (ACC).

2. Description of the Related Art

In general, ACC is to add a fixed-interval driving function to a conventional cruise control function. A cruise control function refers to a function of causing a vehicle to travel at a predetermined speed that a driver sets without using an accelerator pedal. That is, the driver drives the vehicle at the predetermined speed using the accelerator pedal and sets a cruise control mode using a cruise control mode key, and the vehicle continues to maintain the predetermined speed when the cruise control mode is set even if the driver does not use the accelerator pedal. In this way, the cruise control function provides convenience in that the driver can drive the vehicle at a desired speed without using the accelerator or brake pedal.

However, there is a problem in that vehicle accidents may occur during driving the vehicle in the cruise control mode because the vehicle maintains the predetermined speed regardless of whether there is another vehicle ahead.

To prevent such problem, ACC has been suggested.

Specifically, ACC is a system that detects front objects using a front detecting sensor such as a camera and automatically controls lateral movement of a controlled vehicle. This system can relieve the stress on a driver who repeats tasks such as accelerating, braking, and stopping in order to maintain an adequate distance from a front vehicle during road driving. In addition, traffic flow can be made smooth along with the improvement in fuel efficiency by driving the controlled vehicle at the predetermined speed and automatically braking and accelerating the controlled vehicle according to movement of the front objects.

SUMMARY

Aspects of the present invention are directed to enable a driver to directly select a target vehicle for adaptive cruise control (ACC).

That is, the present invention provides a control method of a host vehicle capable of selecting or changing a target vehicle for ACC.

According to an aspect of the present invention, a control method for a host vehicle having adaptive cruise control (ACC) includes selecting a lane or another vehicle as a target lane or a target vehicle for the ACC according to selection of a driver; when the lane is selected, controlling the ACC to cause the host vehicle to travel in the selected target lane; and when the other vehicle is selected, controlling the ACC to cause the host vehicle to follow the selected target vehicle, wherein the controlling includes changing the lane when the target lane or a lane of the target vehicle does not correspond to a lane of the host vehicle.

Here, when the selected target lane is the lane in which the host vehicle travels or the selected target vehicle is another vehicle traveling ahead of the host vehicle in the same lane, the ACC may be continuously performed using the other vehicle traveling ahead of the host vehicle.

Further, the lane may be changed at a predetermined distance from an obstacle to the host vehicle under the control of a speed and a steering angle of the host vehicle.

Furthermore, the control method may further include controlling the ACC to change the lane and select another vehicle traveling ahead of the host vehicle as a preceding vehicle when the selected target lane is not the lane in which the host vehicle travels.

According to an aspect of the present invention, a control system for a host vehicle having adaptive cruise control (ACC) includes: a user interface configured to receive input of a driver; and a control unit that configured to control the ACC to select a lane or another vehicle as a target lane or a target vehicle according to the input of the driver, to drive the host vehicle in the selected target lane, or to follow the selected target vehicle.

Here, when the selected target lane is in a lane in which the host vehicle travels or the selected target vehicle is another vehicle traveling ahead of the host vehicle in the same lane, the control unit may continuously perform the ACC using the other vehicle traveling ahead of the host vehicle.

Further, the control unit may be configured to change the lane when the selected target lane or the selected target vehicle does not correspond to the lane in which the host vehicle travels, and the lane may be changed at a predetermined distance form an obstacle to the host vehicle under the control of a speed and steering of the host vehicle.

Further, when the selected target lane is not the lane in which the host vehicle travels, the lane may be changed, and the other vehicle traveling ahead of the host vehicle may be selected as a preceding vehicle.

Furthermore, the user interface may include a touch screen that receives and displays the input of the driver.

According to an aspect of the present invention, a control system for a host vehicle having adaptive cruise control (ACC) includes: an input unit configured to receive input of a driver; a display unit configured to display the input of the driver; and a control unit that configured to control the ACC to select a lane or another vehicle as a target lane or a target vehicle according to the input of the driver, to drive the host vehicle in the selected target lane, or to follow the selected target vehicle.

Here, when the selected target lane is in a lane in which the host vehicle travels or the selected target vehicle is another vehicle traveling ahead of the host vehicle in the same lane, the control unit may continuously perform the ACC using the other vehicle traveling ahead of the host vehicle.

Further, the control unit may be configured to change the lane when the selected target lane or the selected target vehicle does not correspond to the lane in which the host vehicle travels, and the lane may be changed at a predetermined distance from an obstacle to the host vehicle under the control of a speed and a steering angle of the host vehicle.

Furthermore, when the selected target lane is not the lane in which the host vehicle travels, the lane may be changed, and the other vehicle traveling ahead of the host vehicle may be selected as a preceding vehicle.

In addition, the input unit may be configured to include a turn signal or a touch screen.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
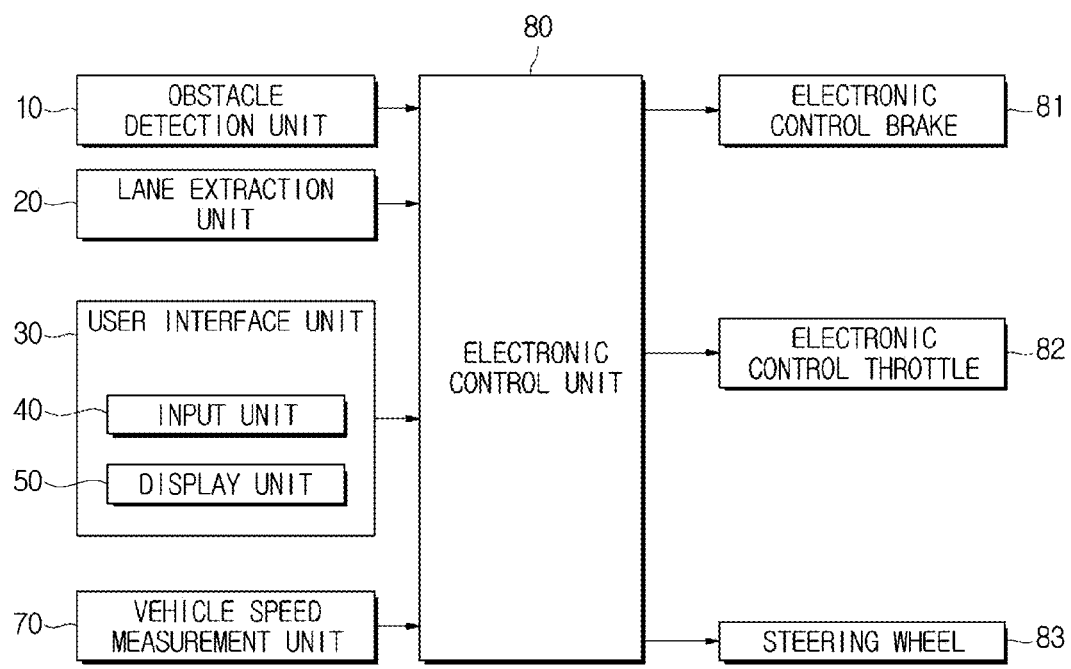
FIG. 1 is a control block diagram of a host vehicle having adaptive cruise control (ACC) according to an embodiment of the present invention.

Reference will now be made in detail to embodiments of the present invention with reference to the accompanying drawings. The following embodiments are provided to fully convey the spirit of the present invention to those skilled in the art.

However, the present invention is not limited only to the embodiments provided here, and may be embodied in many different forms. In the drawings, portions irrelevant to the description will be omitted for clarity, and sizes of the components may be somewhat exaggerated to help understanding of the present invention.

Hereinafter, the embodiments of the present invention will be described with reference to the accompanying drawings.

FIG. 1 is a control block diagram of a host vehicle having adaptive cruise control (ACC) according to an embodiment of the present invention.

Referring to FIG. 1, a control system for a host vehicle includes an obstacle detection unit 10, a lane extraction unit 20, a user interface unit 30, a vehicle speed measurement unit 70, and an electronic control unit 80.

In addition, an electronic control brake 81, an electronic control throttle 82, and a steering wheel 83 are operated under the control of the electronic control unit 80.

The obstacle detection unit 10 detects whether there are other vehicles in front, at the sides, or in the rear of the host vehicle. The obstacle detection unit 10 may include an infrared ray laser module that emits infrared rays to the front, the sides, or the rear of the host vehicle and receives the infrared rays reflected by the other vehicles.

In addition, the infrared ray laser module provides the electronic control unit 80 with electrical signals corresponding to the reflected infrared rays. The electronic control unit 80 may calculate distances between the other vehicles and the host vehicle based on intensities of the reflected infrared rays or time differences between the emitted infrared rays and the reflected infrared rays.

The lane extraction unit 20 extracts lanes in front of the host vehicle, and decides candidate lanes based on results of measuring changes in brightness in images recorded by cameras in front, at the sides, or in the rear of the host vehicle.

Afterward, histograms of the decided candidate lanes may be generated, the candidate lanes located at a short distance from the host vehicle may be detected. Then, curvatures may be calculated for the candidate lanes located at a long distance, and the candidate lanes may be recognized based on the results of the calculation.

Meanwhile, a method of recognizing lanes is known, and is described in detail in Korean Unexamined Patent Application Publication No. 2008-0004834.

The user interface unit 30 is a device that enables a driver to interact with the electronic control unit 80, and includes an input unit 40 that enables the driver to operate the system and a display unit 50 that displays icons indicating conditions in front of the host vehicle and that outputs results of icons selected by the driver.

A touch screen may be used as an example of the user interface unit 30.

In addition, the user interface unit 30 may transfer information about the ACC to the electronic control unit 80 so as to allow the ACC to be controlled by input of the input unit 40.

In addition, the driver may select a target vehicle or a target lane of the ACC using the input unit 40. The display unit 50 displays the icons indicating the conditions in front of the host vehicle recorded by the lane extraction unit 20 and the cameras, and provides the driver with the icons.

Therefore, the driver may select a lane icon or a vehicle icon displayed on the display unit 50, and the selected lane or vehicle icon may be changed in color on the display unit 50 so as to enable the driver to recognize the selection of the lane or the vehicle.

When the display unit 50 is implemented as a touch screen, the driver selects a vehicle or a lane by touching the touch screen, and thereby the user interface unit 30 recognizes the selection of the vehicle or the lane. Therefore, the input unit 40 and the display unit 50 in the user interface unit 30 may be complementarily used.

In addition, the touch screen for the display unit 50 may be replaced with a navigation display mounted on the host vehicle, and is not limited to the navigation display. The touch screen may be replaced with a head-up display that can display the conditions in front of the host vehicle to the driver through a virtual image on a windshield of the host vehicle.

As another example, the driver may view the front conditions displayed on the head-up display which is used as the display unit 50 and select the target vehicle or the target lane by operation of a turn signal switch.

For example, when a driving mode of a vehicle is set to an ACC mode and the turn signal switch is lowered, a vehicle to the left of the current target vehicle may be selected as a new target vehicle, and when the turn signal switch is raised, a vehicle to the right of the current target vehicle may be selected as a new target vehicle.

The driver may select the target vehicle with the turn signal switch and the head-up display used as the display unit 50 may display the selected target vehicle to the driver through a change in color.

The vehicle speed measurement unit 70 detects a driving speed of the host vehicle and transmits information corresponding to the detected driving speed to an electronic control unit 80.

The vehicle speed measurement unit 70 may include various vehicle speed measurement sensors according to measurement methods.

For example, a reed switch type vehicle speed sensor, a photoelectric vehicle speed sensor, and an electronic vehicle speed sensor may be used as the sensor for detecting the speed of the host vehicle.

The electronic vehicle speed sensor may be installed on a transmission. Magnets and a Hall integrated circuit (IC) are mounted in the electronic vehicle speed sensor. Rotation of a speedometer or a driven gear in the transmission is transferred to the magnets through a rotation shaft, and rotation of the magnets causes a change of magnetic field. The vehicle speed may be measured by the Hall IC detecting the change of the magnetic field.

The electronic control unit 80 may control the overall ACC.

Specifically, according to the input of the input unit 40 in the user interface unit 30, the electronic control unit 80 selects the target vehicle or the target lane and recognizes the target lane from the lane extraction unit 20.

In addition, the electronic control unit 80 may recognize a distance from the obstacle detected by the obstacle detection unit 10. The electronic control unit 80 continuously performs the ACC to maintain a preset distance or more, or performs overall control such that, when the lane needs to be changed, the lane can be changed to be safe from the obstacles in front, at the sides, and in the rear of the host vehicle.

In addition, the electronic control brake 81, the electronic control throttle 82, and the steering wheel 83 are operated under the control of the electronic control unit 80. Specifically, the electronic control unit 80 may control the electronic control brake 81 and the electronic control throttle 82 so as to maintain the driving speed of the host vehicle, and control the steering wheel 83 so as to automatically change the lane.

In addition, to safely change the lane, the driving speed of the host vehicle may be adjusted while the host vehicle maintains the predetermined distance from the obstacle detected by the obstacle detection unit 10. To automatically change the lane, the electronic control unit 80 may control the steering wheel 83, the electronic control brake 81, and the electronic control throttle 82 at the same time.

Figure 2:
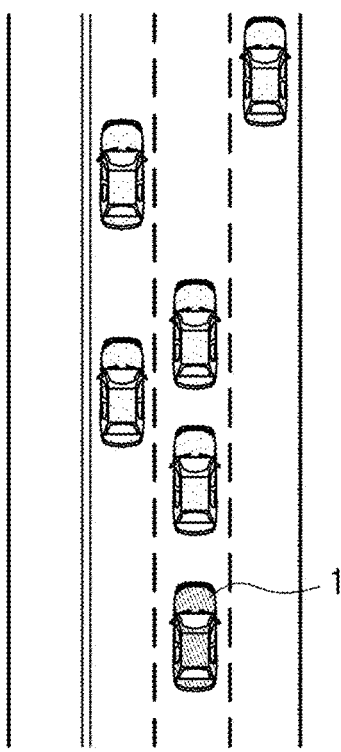
FIG. 2 is a schematic view showing a situation in which a host vehicle having a control system of the present invention travels on a road.
Figure 3:
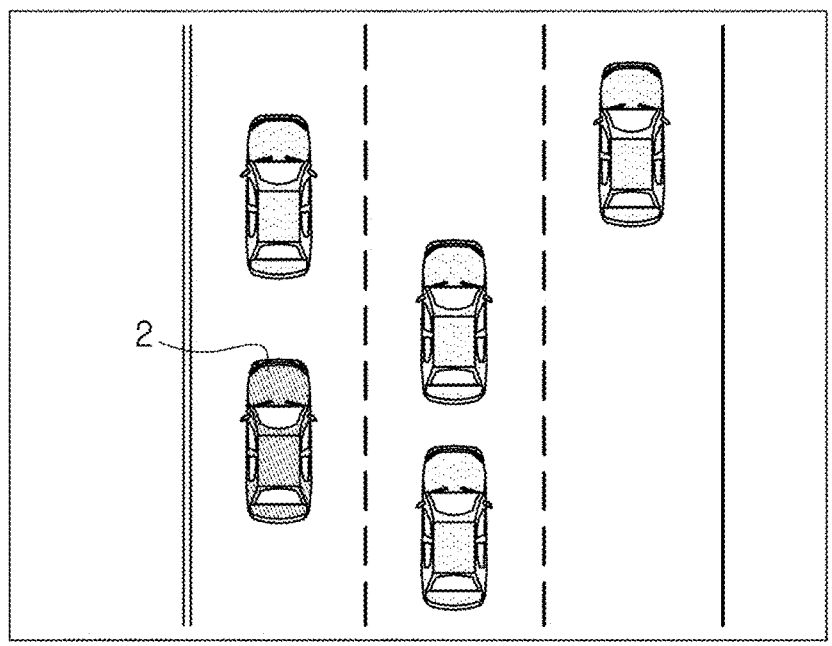
FIG. 3 is a schematic view of a display unit when a driver selects a vehicle.

FIG. 2 is a schematic view showing a situation in which a host vehicle 1 having a control system 11 of the present invention runs on a road. FIG. 3 is a schematic view showing the display unit 50 when the driver selects the target vehicle in the road situation of FIG. 2.

When the driver selects one of vehicle icons that correspond to vehicles in front of the host vehicle 1 and are displayed on the display unit 50 using the input unit 40, the selected vehicle icon 2 may be chosen as the target vehicle of the ACC, and the ACC may be continuously performed to follow the target vehicle for the selected vehicle icon 2.

At this time, the display unit 50 may display the vehicle icon 2 which the driver wants to select through a change in color, so that the driver can know that the vehicle icon 2 is selected.

As shown in FIG. 3, the driver may select vehicle icon 2 in a lane other than that of the host vehicle 1.

When the driver selects the vehicle icon 2 in the other lane, the electronic control unit 80 safely changes the lane into the other lane of the vehicle icon 2 using the information received from the obstacle detection unit 10, the lane extraction unit 20, and the vehicle speed measurement unit 70, and then continuously perform the ACC so as to be able to follow the selected target vehicle.

Specifically, after the lane is changed, the ACC may be continuously performed such that the vehicle in front of the host vehicle is chosen as a preceding vehicle.

Figure 4:
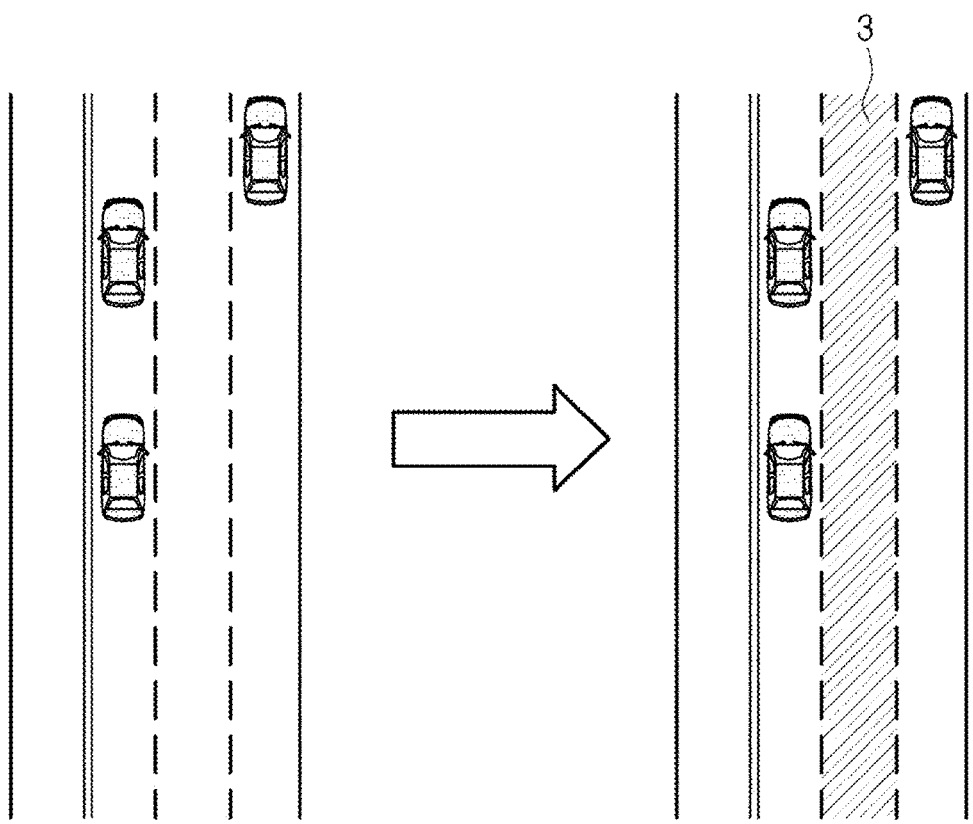
FIG. 4 is a schematic view of the display unit when the driver selects a lane.

When there is no vehicle to select in a desired lane, the driver may, as shown in FIG. 4, choose a lane icon 3 based on the lane extracted by the lane extraction unit 20.

When the driver selects the lane icon 3 and a lane of the selected lane icon 3 is the lane of the host vehicle 1, the ACC may be continuously performed.

At this time, the display unit 50 may display the lane icon which the driver wants to select through a change in color, so that the driver can know that the lane icon is selected.

In addition, if there is not the lane of the host vehicle 1, the electronic control unit 80 may change the lane into a safe lane of the selected lane icon 3 using the information received from the obstacle detection unit 10, the lane extraction unit 20, and the vehicle speed measurement unit 70, and the ACC may be continuously performed in the changed lane.

Figure 5:
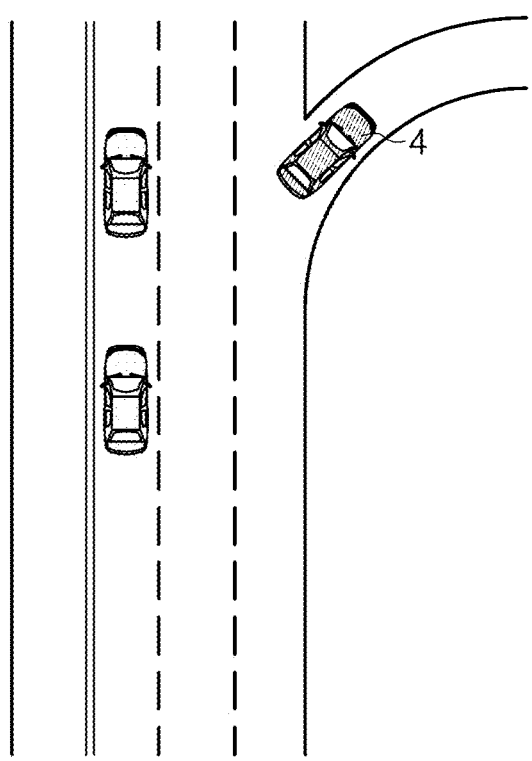
FIG. 5 is a schematic view showing another example of the display unit when the driver selects the vehicle.

FIG. 5 is a schematic view of a display unit when the driver selects a vehicle according to another embodiment.

As shown in FIG. 5, the driver may select the vehicle icon 4 in a lane other than that of the host vehicle 1.

When the driver selects the vehicle icon 4 in the other lane, the electronic control unit 80 may safely change the lane into the other lane of the vehicle icon 4 using the information received from the obstacle detection unit 10, the lane extraction unit 20, and the vehicle speed measurement unit 70, and then the ACC may be continuously performed to be able to follow a vehicle of the selected vehicle icon 4.

At this time, the display unit 50 may display the vehicle icon 4 which the driver wants to select through a change in color, so that the driver can know that the vehicle icon 4 is selected.

In addition, as shown FIG. 5, when the vehicle icon 4 for a lane along which a preceding vehicle leaves an expressway is selected, the host vehicle may be assisted to automatically follow a vehicle of the selected vehicle icon 4 so as to be able to safely leave the expressway without directly controlling steering of the driver, and the ACC may be continuously performed.

Figure 6:
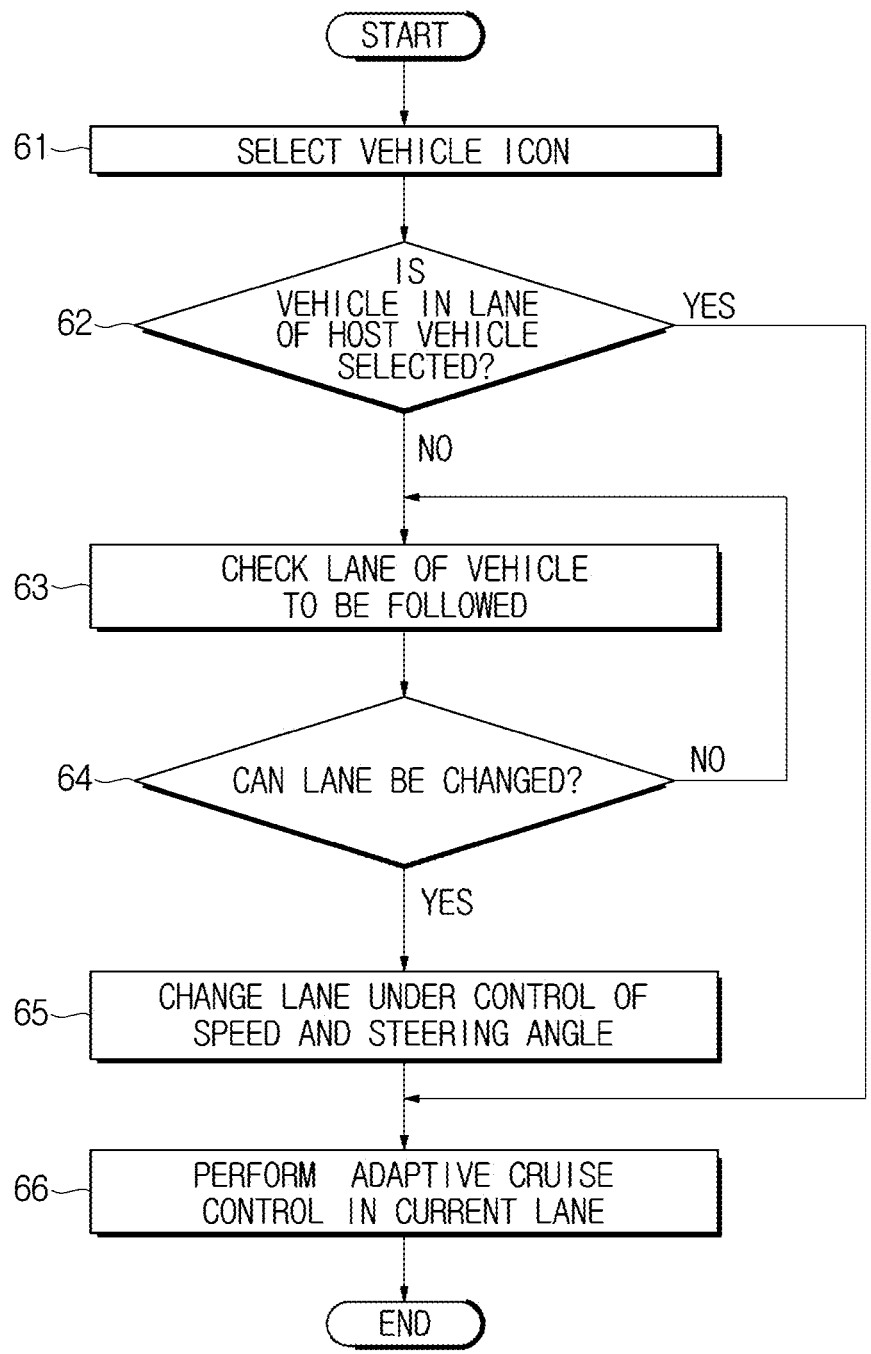
FIG. 6 is a flowchart of a vehicle control system when the driver selects the vehicle.
Figure 7:
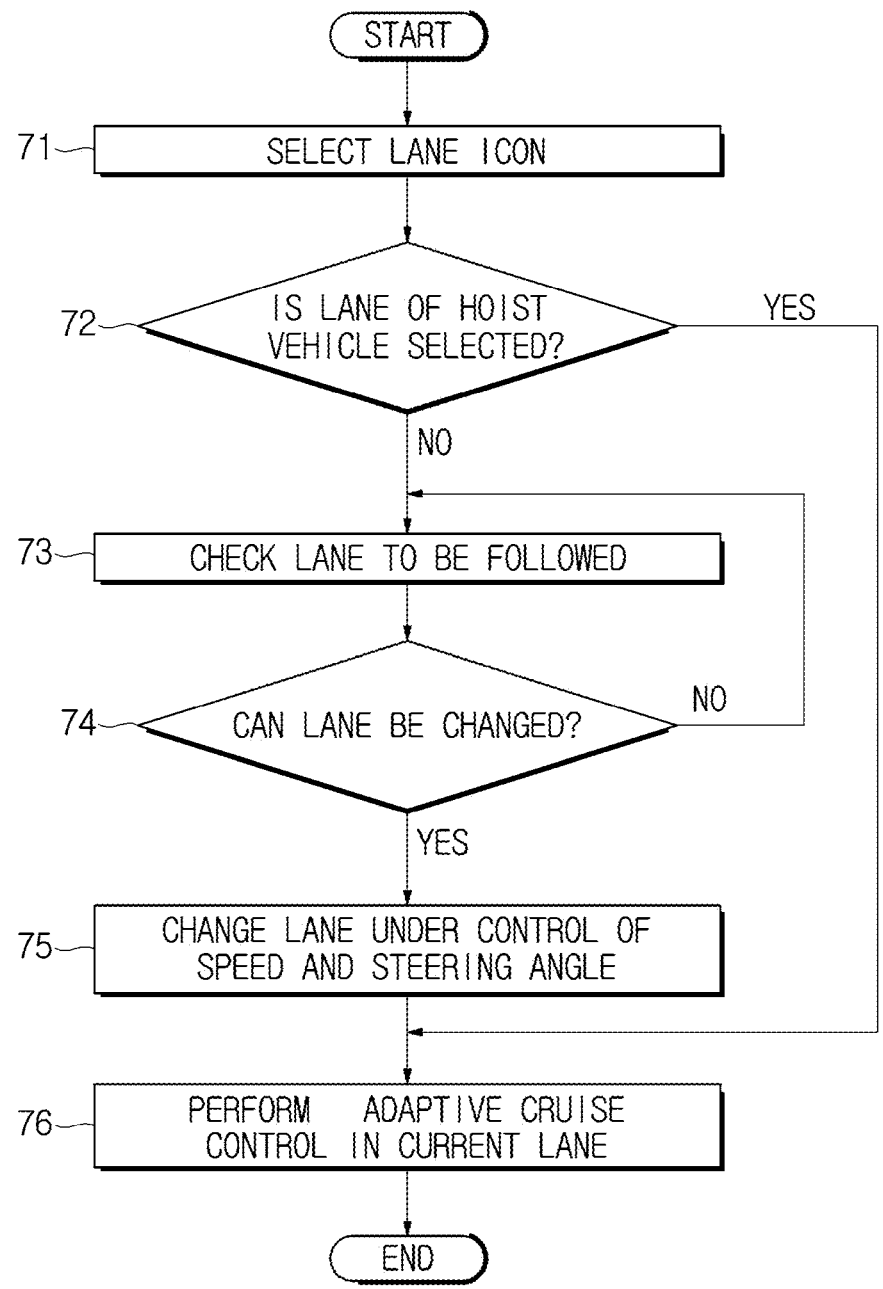
FIG. 7 is a flowchart of a vehicle control system when the driver selects the lane.

FIG. 6 is a flowchart of a control system for a vehicle when a driver selects a vehicle. FIG. 7 is a flowchart of the control system for the vehicle when the driver selects a lane.

In accordance with an embodiment of the present invention, the driver may choose a vehicle or a lane displayed on the display unit 50.

In accordance with an embodiment of the present invention, when the driver selects a vehicle icon using the input unit 40 in the user interface unit 30 (S61), it is determined whether a vehicle is in the same lane as the host vehicle by detecting a lane extracted by the extraction unit 20 (S62).

When another vehicle is in the same lane as the host vehicle (YES in S62), the current lane is maintained, and the ACC is continuously performed (S66).

When no other vehicle is in the same lane as the host vehicle (NO in S62), the lane of the selected vehicle is checked through the lane extraction unit 20 (S63).

It is determined whether the lane can be changed based on the information received from the obstacle detection unit 10, the vehicle speed measurement unit 70, etc. in order to change the lane into the lane of the selected vehicle icon and to continuously perform the ACC (S64).

When it is determined that the lane can be changed (YES in S64), the lane is changed under the control of a steering angle using the steering wheel 83 and under the control of a vehicle speed using the electronic control brake 81 and the electronic control throttle 82 (S65).

When it is determined that the lane cannot be changed (NO in S64), the lane of the vehicle to be followed is rechecked (S63).

After the lane is changed, when the host vehicle travels in the same lane as the selected vehicle, the host vehicle follows the selected vehicle in the current lane, and the ACC is continuously performed (S66). Specifically, after the lane is changed, the ACC may be continuously performed such that a vehicle in front of the host vehicle is chosen as a preceding vehicle.

FIG. 7 is a flowchart of a control system for a vehicle 11 when a driver selects a lane instead of a vehicle.

In accordance with an embodiment of the present invention, when the driver selects a lane icon 71 using the input unit 40 in the user interface unit 30 (S71), it is determined whether the lane is the same lane in which the host vehicle travels by detecting a lane extracted by the extraction unit 20 (S72).

When the lane in which the host vehicle travels is selected (YES in S72), the lane is maintained, and the ACC is continuously performed (S76).

When the lane in which the host vehicle travels is not selected (NO in S72), the selected lane is checked through the lane extraction unit 20 (S73).

It is determined whether the lane can be changed based on the information received from the obstacle detection unit 10, the vehicle speed measurement unit 70, etc. in order to change the lane into the selected lane and continuously perform the ACC (S74).

When it is determined that the lane can be changed (YES in S74), the lane is changed under the control of a steering angle using the steering wheel 83 and under the control of a vehicle speed using the electronic control brake 81 and the electronic control throttle 82 (S75).

When it is determined that the lane cannot be changed (NO in S74), the lane to be followed is rechecked (S73).

After the lane is changed, when the host vehicle continues in the same lane as the selected lane, the ACC is continuously performed in the current lane (S76).

Specifically, after the lane is changed, the ACC may be continuously performed such that a vehicle in front of the host vehicle is chosen as a preceding vehicle.

Figure 8:
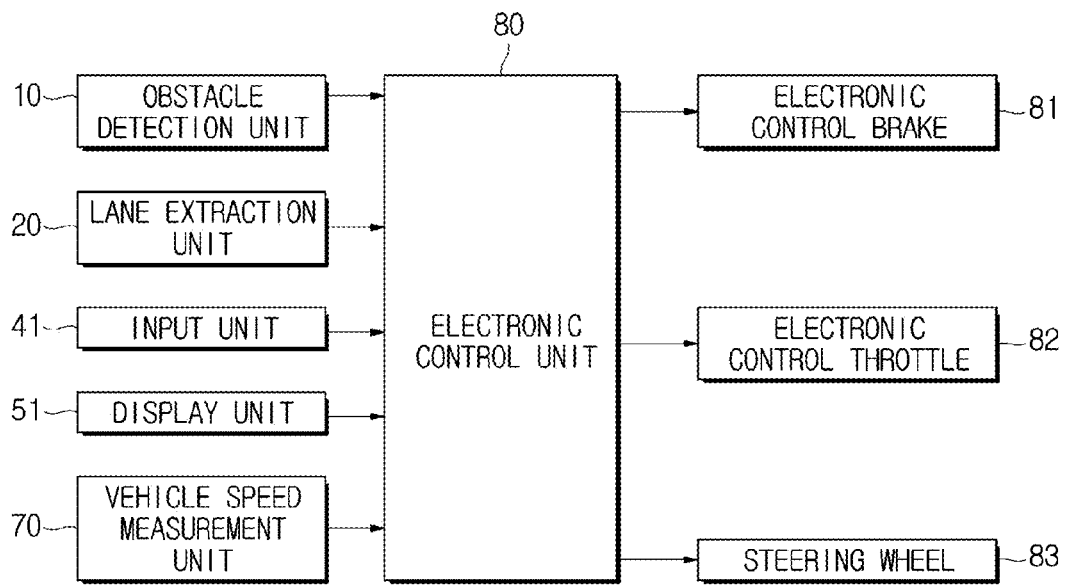
FIG. 8 is a control block diagram showing a host vehicle having ACC according to another embodiment of the present invention.

FIG. 8 is a control block diagram showing a control system for a vehicle having ACC according to another embodiment of the present invention.

As shown in FIG. 8, a control system for a vehicle may include an obstacle detection unit 10, a lane extraction unit 20, an input unit 41, a display unit 51, a vehicle speed measurement unit 70, and an electronic control unit 80.

The obstacle detection unit 10, the vehicle speed extraction unit 20, the vehicle speed measurement unit 70, and the electronic control unit 80 in the control system according to this embodiment of the present invention may be the same as those described with reference to FIG. 1.

The input unit 41 may be a device through which a driver can interact with the electronic control unit 80 and may receive selection when the driver operates the system.

A touch screen may be used as an example of the aforementioned input unit 41, and a turn signal switch and the like may also be used as an example of the input unit 41.

Specifically, when a driving mode of the vehicle is set to the ACC mode and the turn signal switch is lowered, a vehicle to the left of a current target vehicle may be selected as a new target vehicle. When the turn signal switch is raised, a vehicle to the right of the current target vehicle of may be selected as a new target vehicle.

The driver may choose the target vehicle or the target lane for the ACC using the input unit 41, and the display unit 51 may display conditions, which are in front of the host vehicle and are recorded by the lane extraction unit 20 and camera sensors, to the driver.

When the display unit 51 is implemented as a touch screen, the driver may select a vehicle or a lane by touching the touch screen and the vehicle or the lane may be recognized.

In addition, a navigation display mounted on the vehicle may be used as the touch screen of the display unit 51, but the present invention is not limited thereto. A head-up display may display the front conditions to the driver through an image on a windshield of the host vehicle.

In accordance with another embodiment of the present invention, the driver may view the front conditions displayed in the head-up display used as the display unit 51 and may select a target vehicle or a target lane by operating the turn signal switch.

In the embodiments of the present invention, the driver can directly select or change the target vehicle for the ACC. Thereby, a problem that the driver feels a gap in operation of ACC when the determination of the driver is different from the information detected by the front detecting sensor can be overcome.

In addition, in the embodiments of the present invention, the driver can select the target vehicle to be followed, and the lane can be automatically changed into another lane in which the target vehicle travels. Thereby, it is unnecessary for the driver to change the lane, so that the ACC can be more conveniently used.

Although a few embodiments of the present invention have been shown and described, it would be appreciated by those skilled in the art that changes may be made in these embodiments without departing from the principles and spirit of the invention, the scope of which is defined in the claims and their equivalents.

DRAWINGS

FIG. 1
10: OBSTACLE DETECTION UNIT
20: LANE EXTRACTION UNIT
30: USER INTERFACE UNIT
40: INPUT UNIT
50: DISPLAY UNIT
70: VEHICLE SPEED MEASUREMENT UNIT
80: ELECTRONIC CONTROL UNIT
81: ELECTRONIC CONTROL BRAKE
82: ELECTRONIC CONTROL THROTTLE
83: STEERING WHEEL
FIG. 6
START
S61: SELECT VEHICLE ICON
S62: IS VEHICLE IN LANE OF HOST VEHICLE SELECTED?
S63: CHECK LANE OF VEHICLE TO BE FOLLOWED
S64: CAN LANE BE CHANGED?
S65: CHANGE LANE UNDER CONTROL OF SPEED AND STEERING ANGLE

S66: PERFORM ADAPTIVE CRUISE CONTROL IN CURRENT LANE
END
FIG. 7
START
S71: SELECT LANE ICON
S72: IS LANE OF HOIST VEHICLE SELECTED?
S73: CHECK LANE TO BE FOLLOWED
S74: CAN LANE BE CHANGED?
S75: CHANGE LANE UNDER CONTROL OF SPEED AND STEERING ANGLE
S76: PERFORM ADAPTIVE CRUISE CONTROL IN CURRENT LANE
END
FIG. 8
10: OBSTACLE DETECTION UNIT
20: LANE EXTRACTION UNIT
41: INPUT UNIT
51: DISPLAY UNIT
70: VEHICLE SPEED MEASUREMENT UNIT
80: ELECTRONIC CONTROL UNIT
81: ELECTRONIC CONTROL BRAKE
82: ELECTRONIC CONTROL THROTTLE
83: STEERING WHEEL

What is claimed is:

1. A control method for a host vehicle having adaptive cruise control (ACC), the control method comprising:
providing an user interface receiving selection of a driver among one or more lanes and one or more vehicles to set a target for the ACC;
when a lane is selected among the one or more lanes and the one or more vehicles, controlling the ACC to cause the host vehicle to travel in the selected lane; and
when an other vehicle is selected among the one or more lanes and the one or more vehicles, controlling the ACC to cause the host vehicle to follow the selected vehicle,
wherein the controlling includes changing a lane of the host vehicle when the selected lane or a lane of the selected vehicle does not correspond to a lane that the host vehicle is traveling.

2. The control method of claim 1, wherein, when the selected lane as the target is a lane in which the host vehicle travels or the selected vehicle as the target is another vehicle traveling ahead of the host vehicle in the same lane, the ACC is continuously performed using the other vehicle traveling ahead of the host vehicle.

3. The control method of claim 1, wherein the lane of the host vehicle is changed at a predetermined distance from an obstacle to the host vehicle under the control of a speed and a steering angle of the host vehicle.

4. The control method of claim 3, further comprising controlling the ACC to change the lane of the host vehicle and select another vehicle traveling ahead of the host vehicle as a preceding vehicle when the selected lane as the target is not the lane in which the host vehicle travels.

5. A control system for a host vehicle having adaptive cruise control (ACC), the control system comprising:
a user interface for receiving selection of a driver among one or more lanes and one or more vehicles; and
a controller for controlling the ACC to set the selected lane as a target lane and set the selected vehicle as a target vehicle according to the selection of the driver, to drive the host vehicle in the selected target lane and to follow the selected target vehicle.

6. The control system of claim 5, wherein, when the selected target lane is in a lane in which the host vehicle travels or the selected target vehicle is another vehicle traveling ahead of the host vehicle in the same lane, the controller continuously performs the ACC using the other vehicle traveling ahead of the host vehicle.

7. The control system of claim 6, wherein:
the controller changes the lane of the host vehicle when the selected target lane or a lane of the selected target vehicle does not correspond to the lane in which the host vehicle travels; and
the lane of the host vehicle is changed at a predetermined distance from an obstacle to the host vehicle under the control of a speed and steering of the host vehicle.

8. The control system of claim 7, wherein, when the selected target lane is not the lane in which the host vehicle travels, the lane of the host vehicle is changed, and the other vehicle traveling ahead of the host vehicle is selected as a preceding vehicle.

9. The control system of claim 8, wherein the user interface includes a touch screen that receives and displays the input of the driver.

10. The control system of claim 6, wherein the user interface includes a touch screen that receives and displays the input of the driver.

11. The control system of claim 7, wherein the user interface includes a touch screen that receives and displays the input of the driver.

12. The control system of claim 5, wherein the user interface includes a touch screen that receives and displays the input of the driver.

13. A control system for a vehicle having adaptive cruise control (ACC), the control system comprising:
an input for receiving input of a driver;
a display for displaying the input of the driver; and
a controller for controlling the ACC to select a target among one or more lanes and one or more vehicles according to the input of the driver, to drive the host vehicle in the lane selected as the target, and to follow the vehicle selected as the target.

14. The control system of claim 13, wherein, when the lane selected as the target is in a lane in which the host vehicle travels or the vehicle selected as the target is another vehicle traveling ahead of the host vehicle in the same lane, the controller continuously performs the ACC using the other vehicle traveling ahead of the host vehicle.

15. The control system of claim 14, wherein:
The controller changes the lane of the host vehicle when the lane selected as the target or a lane of the vehicle selected as the target does not correspond to the lane in which the host vehicle travels; and
the lane of the host vehicle is changed at a predetermined distance from an obstacle to the host vehicle under the control of a speed and a steering angle of the host vehicle.

16. The control system of claim 15, wherein, when the lane selected as the target is not the lane in which the host vehicle travels, the lane of the host vehicle is changed, and the other vehicle traveling ahead of the host vehicle is selected as a preceding vehicle.

17. The control system of claim 16, wherein the input includes a turn signal or a touch screen.

18. The control system of claim 14, wherein the input includes a turn signal or a touch screen.

19. The control system of claim 15, wherein the input includes a turn signal or a touch screen.

20. The control system of claim 13, wherein the input includes a turn signal or a touch screen.

* * * * *